United States Patent
Kim (10) Patent No.: US 11,016,623 B2
(45) Date of Patent: May 25, 2021

(54) TOUCH SENSOR PANEL

(71) Applicant: HiDeep Inc., Gyeonggi-do (KR)

(72) Inventor: Jongsik Kim, Gyeonggi-do (KR)

(73) Assignee: HiDeep Inc.

( * ) Notice: Subject to any disclaimer, the term of this patent is extended or adjusted under 35 U.S.C. 154(b) by 0 days.

(21) Appl. No.: 16/008,541

(22) Filed: Jun. 14, 2018

(65) Prior Publication Data

US 2018/0364826 A1    Dec. 20, 2018

(30) Foreign Application Priority Data

Jun. 20, 2017    (KR) .......................... 10-2017-0077873

(51) Int. Cl.
*G06F 3/041*    (2006.01)
*G06F 3/044*    (2006.01)

(52) U.S. Cl.
CPC ............ *G06F 3/0445* (2019.05); *G06F 3/041* (2013.01)

(58) Field of Classification Search
CPC .................................. G06F 3/041; G06F 3/044
See application file for complete search history.

(56) References Cited

U.S. PATENT DOCUMENTS

2007/0074914 A1*    4/2007 Geaghan ................. G06F 3/044
178/18.06

2011/0187676 A1*    8/2011 Chang ................... H03K 17/962
345/174
2016/0077624 A1*    3/2016 Zhao ..................... H04L 45/245
345/174

FOREIGN PATENT DOCUMENTS

KR    1020120037773    4/2012
KR    1020140042133    4/2014
KR    10-2015-0052906 A    5/2015

OTHER PUBLICATIONS

Korean Office Action dated Oct. 25, 2018.

* cited by examiner

*Primary Examiner* — Wing H Chow
(74) *Attorney, Agent, or Firm* — The Belles Group, P.C.

(57) ABSTRACT

A touch sensor panel may be provided that includes a plurality of drive electrodes formed in a first layer; and a plurality of receiving electrodes which are arranged to cross the plurality of drive electrodes and are formed in a second layer. In the plurality of drive electrodes, a column of drive electrodes is formed by connecting a plurality of lozenge-shaped unit electrodes in a column direction, and the drive electrodes of each column are disposed at a regular interval in a row direction. The plurality of receiving electrodes are composed of a line having a predetermined width and are arranged in the row direction in such a way as to pass through a center of the unit electrode. Through this, the touch sensor panel capable of linearly detecting the change of the capacitance is provided, so that touch position can be accurately detected.

16 Claims, 11 Drawing Sheets

| Simulation Interpolability | |
|---|---|
| Tx width ( 2.9043 ) 1PHI | 0.910821 |
| Tx width ( 1.45215 ) 1PHI | 1.14828 |
| Tx width ( 0.4 ) 1PHI | 0.58821 |
| New Tx Pattern | 1.157884 |

Fig. 10

|  |  | New blur |
|---|---|---|
| Tx 2.9 | RMS | 0.079475843 |
|  | AVG | 0.008019829 |
| Tx 1.45 | RMS | 0.025951475 |
|  | AVG | 0.001347891 |
| Tx 0.4 | RMS | 0.032103896 |
|  | AVG | 0.001960139 |
| New Tx Pattern | RMS | 0.022722053 |
|  | AVG | 0.001157372 |

TOUCH SENSOR PANEL

CROSS REFERENCE TO RELATED APPLICATIONS

Priority is claimed under 35 U.S.C. § 119 to Korean Patent Application No. 10-2017-0077873, filed Jun. 20, 2017, the disclosure of which is incorporated herein by reference in its entirety.

BACKGROUND

Field

The present disclosure relates to a touch sensor panel and more particularly to a touch sensor panel which senses a touch on the touch sensor panel and a position of the touch through a capacitance change or a capacitance change amount.

Description of the Related Art

Various kinds of input devices are being used to operate a computing system. For example, the input device includes a button, key, joystick and touch screen. Since the touch screen is easy and simple to operate, the touch screen is increasingly being used to operate the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and a position of the touch on the touch screen and analyzes the touch, and thus, performs operations in accordance with the analysis.

Particularly, when the touch is input by using an object such as user's finger, a stylus pen with a small contact area, etc., there is a need to accurately detect the position of the touch on the touch screen without degrading the performance of a display module.

BRIEF SUMMARY

One embodiment is a touch sensor panel including: a plurality of drive electrodes formed in a first layer; and a plurality of receiving electrodes which are arranged to cross the plurality of drive electrodes and are formed in a second layer. In the plurality of drive electrodes, a column of drive electrodes is formed by connecting a plurality of lozenge-shaped unit electrodes in a column direction, and the drive electrodes of each column are disposed at a regular interval in a row direction. The plurality of receiving electrodes are composed of a line having a predetermined width and are arranged in the row direction in such a way as to pass through a center of the unit electrode.

The unit electrode may have a right-and-left and up-and-down symmetrical shape with respect to the center.

The lozenge-shaped unit electrode may be formed by connecting each side of the lozenge-shaped unit electrode with convex line or concave line.

The touch sensor panel may further include an insulation layer between the first layer and the second layer.

The plurality of receiving electrodes may be disposed such that a center line of a line having a predetermined width crosses the center of each unit electrode.

DETAILED DESCRIPTION

Specific embodiments of the present invention will be described in detail with reference to the accompanying drawings. The specific embodiments shown in the accompanying drawings will be described in enough detail that those skilled in the art are able to embody the present invention. Other embodiments other than the specific embodiments are mutually different, but do not have to be mutually exclusive. Additionally, it should be understood that the following detailed description is not intended to be limited.

The detailed descriptions of the specific embodiments shown in the accompanying drawings are intended to be read in connection with the accompanying drawings, which are to be considered part of the entire written description. Any reference to direction or orientation is merely intended for convenience of description and is not intended in any way to limit the scope of the present invention.

Specifically, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation.

Terms such as "attached," "affixed," "connected," "coupled," "interconnected," and similar refer to a relationship wherein structures are attached, connected or fixed to one another either directly or indirectly through intervening structures, as well as both movable or rigid attachments or relationships, unless expressly described otherwise.

The touch input device including the touch sensor panel according to the embodiment of the present invention can be used not only in a portable electronic product such as a smartphone, tablet PC, laptop computer, personal digital assistant (PDA), MP3 player, camera, camcorder, electronic dictionary, etc., but also in an electric home appliance such as a home PC, TV, DVD, refrigerator, air conditioner, microwave, etc. Also, the touch input device including the touch sensor panel according to the embodiment of the present invention can be used without limitation in all of the products requiring a device for display and input such as an industrial control device, a medical device, etc.

Hereinafter, a touch input device according to the embodiment of the present invention will be described with reference to the accompanying drawings. Hereinafter, while a capacitive touch sensor panel 100 is exemplified below, it is possible to apply the touch sensor panel 100 capable of detecting a touch position and/or a touch pressure in any manner.

Figure 1:
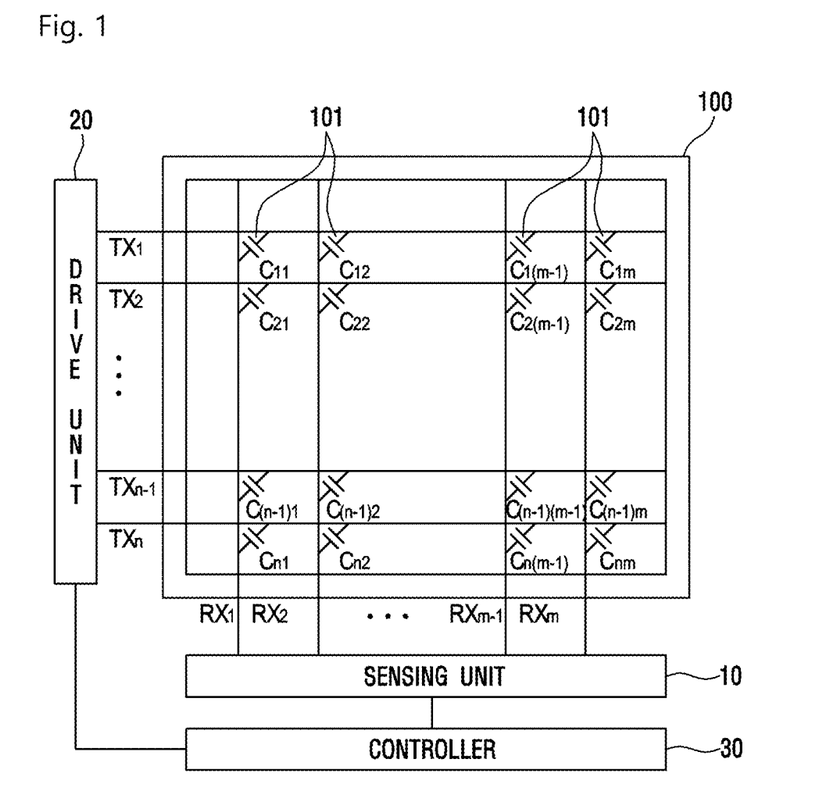
FIG. 1 is a schematic view for describing a capacitive touch sensor panel according to an embodiment of the present invention and operations thereof.

FIG. 1 is a schematic view for describing the capacitive touch sensor panel 100 according to the embodiment of the present invention and operations thereof. Referring to FIG. 1, the touch sensor panel 100 according to the embodiment of the present invention includes a plurality of drive electrodes TX1 to TXn and a plurality of receiving electrodes RX1 to RXm. The touch sensor panel 100 may be connected to a drive unit 20, a sensing unit 10, and a controller 30. The drive unit 20 applies a drive signal to the plurality of drive electrodes TX1 to TXn for the purpose of the operation of the touch sensor panel 100. The sensing unit 10 receives a sensing signal including information on the capacitance change amount changing according to the touch on the touch surface of the touch sensor panel 100. The controller 30 applies a control signal to the drive unit 20 and detects whether the touch occurs or not and the touch position on the basis of the sensing signal received from the sensing unit 10.

As shown in FIG. 1, the touch sensor panel 100 may include the plurality of drive electrodes TX1 to TXn and the plurality of receiving electrodes RX1 to RXm. FIG. 1 shows that the plurality of drive electrodes TX1 to TXn and the plurality of receiving electrodes RX1 to RXm of the touch sensor panel 100 form an orthogonal array.

The plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction. Here, when the drive electrode TX is formed in a row direction, the receiving electrode RX is formed in a column direction in such a way as to cross the drive electrode TX. Also, when the drive electrode TX is formed in the column direction, the receiving electrode RX is formed in the row direction in such a way as to cross the drive electrode TX.

The plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulating layer (not shown) respectively. Alternatively, the plurality of drive electrodes TX1 to TXn may be formed on one side of a first insulating layer (not shown) and the plurality of receiving electrodes RX1 to RXm may be formed one side of a second insulating layer (not shown) different from the first insulating layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper, or carbon nanotube (CNT). Also, the drive electrode TX and the receiving electrode RX may be made of a metal mesh or nano silver material.

The drive unit 20 according to the embodiment of the present invention may apply the drive signal to the drive electrodes TX1 to TXn. In the embodiment, the drive signal may be sequentially applied to one electrode at a time from the first drive electrode TX1 to the n-th drive electrode TXn. The drive signal may be applied again repeatedly. This is only an example. The drive signal may be applied to the plurality of drive electrodes TX1 to TXn at the same time in accordance with the embodiment.

Through the receiving electrodes RX1 to RXm, the sensing unit 10 receives the sensing signal including information on a capacitance (Cnm) 101 generated between the receiving electrodes RX1 to RXm and the drive electrodes TX1 to TXn to which the drive signal has been applied. For example, the sensing signal may be a signal coupled by the capacitance (Cnm) 101 generated between the receiving electrode RX and the drive electrode TX to which the drive signal has been applied. As such, the process of sensing the drive signal applied from the first drive electrode TX1 to the n-th drive electrode TXn through the receiving electrodes RX1 to RXm can be referred to as a process of scanning the touch sensor panel 10.

For example, the sensing unit 10 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (Cnm) 101, and then converts the integrated current signal into voltage. The sensing unit 10 may further include an analog to digital converter (ADC) (not shown) which converts the integrated data by the receiver into digital data. Later, the digital data may be input to the controller 30 and processed to obtain information on the touch on the touch sensor panel 100. The sensing unit 10 may be integrally formed with the ADC and controller 30 as well as the receiver.

The controller 30 may perform a function of controlling the operations of the drive unit 20 and the sensing unit 10. For example, the controller 30 generates and transmits a drive control signal to the drive unit 20, so that the drive signal can be applied to a predetermined drive electrode TX1 at a predetermined time. Also, the controller 30 generates and transmits the drive control signal to the sensing unit 10, so that the sensing unit 10 may receive the sensing signal from the predetermined receiving electrode RX at a predetermined time and perform a predetermined function.

In FIG. 1, the drive unit 20 and the sensing unit 10 may constitute a touch detection device (not shown) capable of detecting whether or not the touch has occurred on the touch sensor panel 100 according to the embodiment of the present invention and where the touch has occurred. The touch detection device according to the embodiment of the present invention may further include the controller 30. The touch detection device according to the embodiment of the present invention may be integrated and implemented on a touch sensing integrated circuit (IC) in a touch input device 1000 including the touch sensor panel 100. The drive electrode TX and the receiving electrode RX included in the touch sensor panel 100 may be connected to the drive unit 20 and the sensing unit 10 included in the touch sensing IC (not shown) through, for example, a conductive trace and/or a conductive pattern printed on a circuit board, or the like. The touch sensing IC may be placed on a circuit board on which the conductive pattern has been printed, for example, a first printed circuit board (hereafter, referred to as a first PCB). According to the embodiment, the touch sensing IC may be mounted on a main board for operation of the touch input device.

As described above, a capacitance (Cnm) with a predetermined value is generated at each crossing of the drive electrode TX and the receiving electrode RX. When an object like fingers, palms or stylus, etc., approaches close to the touch sensor panel 100, the value of the capacitance may be changed. In FIG. 1, the capacitance may represent a mutual capacitance (Cnm). The sensing unit 10 senses such electrical characteristics, thereby being able to sense whether the touch has occurred on the touch sensor panel 100 or not and where the touch has occurred. For example, the sensing unit 10 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the drive signal has been applied is detected, so that the position of the second axial direction of the touch can be detected. Likewise, when the touch occurs on the touch sensor panel 100, a capacitance change is detected from the reception signal received through the receiving electrode RX, so that the position of the first axial direction of the touch can be detected.

In the touch input device according to the embodiment of the present invention, the touch sensor panel 100 for detecting where the touch has occurred may be positioned outside or inside a display module.

The display module of the touch input device on which the touch sensor panel 100 according to the embodiment of the present invention is mounted may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. Here, the display module may include a control circuit which receives an input from an application processor (AP) or a central processing unit (CPU) on a main board for the operation of the touch input device and displays the contents that the user wants on the display panel. The control circuit may be mounted on a second printed circuit board (hereafter, referred to as a second PCB). Here, the control circuit for the operation of the display module may include a display panel control IC, a graphic controller IC, and a circuit required to operate other display panels.

Figure 2:
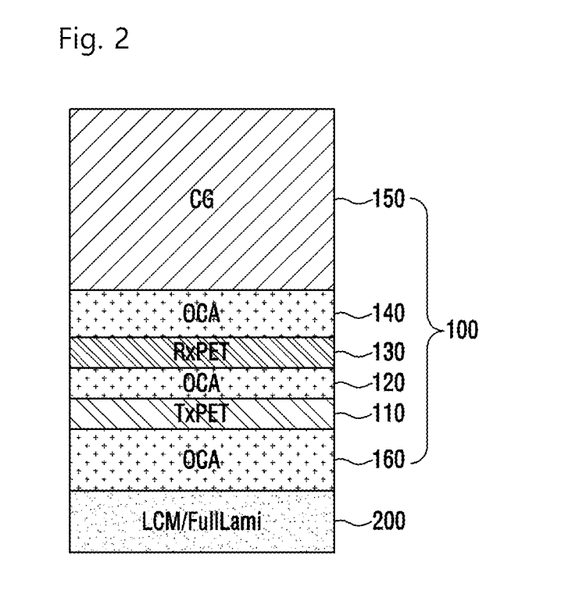
FIG. 2 is a view showing the layered structure of the touch sensor panel according to the embodiment of the present invention.

FIG. 2 is a view showing the layered structure of the touch sensor panel 100 according to the embodiment of the present invention.

Referring to FIG. 2, the touch sensor panel 100 according to the embodiment of the present invention may have a structure which includes a first insulating sheet 110 including the drive electrode, a first adhesive layer 120, and a second insulating sheet 130 including the receiving electrode. Also, the touch sensor panel 100 according to the embodiment of the present invention may further include a second adhesive layer 140 and a cover glass 150 on the second insulation sheet 130. Here, the touch sensor panel 100 according to the embodiment of the present invention can be connected to the display module through a third adhesive layer 160 under the first insulating sheet 110.

The first insulating sheet 110 and the second insulating sheet 130 may be an insulation material layer such as Polyethylene terephthalate (PET), glass, or the like. The patterns of the drive electrode and the receiving electrode may be formed respectively such that the drive electrode is included on the same plane (a first layer) of the first insulating sheet 110 and the receiving electrode is included on the same plane (a second layer) of the second insulating sheet 130.

The first adhesive layer 120, the second adhesive layer 140, and the third adhesive layer 160 may be made of an optical clear adhesive (OCA) or resin. The first adhesive layer 120 can cause the first insulating sheet 110 and the second insulating sheet 130 to adhere to each other. The second adhesive layer 140 can cause the first insulating sheet 110 and display module to adhere to each other. The third adhesive layer 160 can cause the second insulating sheet 130 and the cover glass 150 to adhere to each other.

Here, the drive electrode and the receiving electrode may be an Indium Tin Oxide (ITO) electrode respectively or may be composed of tin oxide ($SnO_2$), indium oxide ($In_2O_3$), silver ink, copper, or carbon nanotube (CNT), etc. The drive electrode and the receiving electrode are formed in different layers (the first layer and the second layer). When a part of the user's body or a stylus pen approaches, the mutual capacitance may be changed. As such, by detecting the change of the mutual capacitance, it is possible to detect whether or not the touch has occurred on the touch sensor panel and/or the touch position. The cover glass 150 made of glass may be further formed at the uppermost portions of the drive electrode and the receiving electrode in order to protect the electrode.

It is shown that the touch sensor panel 100 according to the embodiment of the present invention is laminated on and attached to the display module by means of an adhesive. However, according to the embodiment of the present invention, the touch sensor panel 100 may be disposed within the display module, or may be fixed only at the edge of the display module by means of an adhesive and may include an air gap.

Figure 3A:
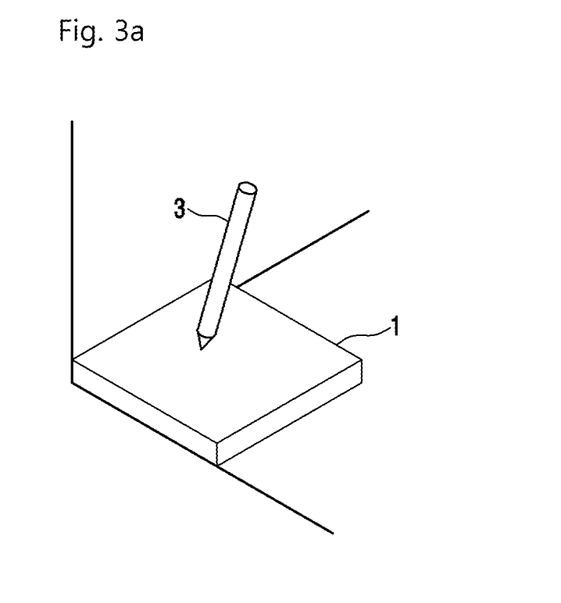
FIG. 3*a* is a view for describing a typical operation to touch the touch sensor panel by using a stylus pen.
Figure 3B:
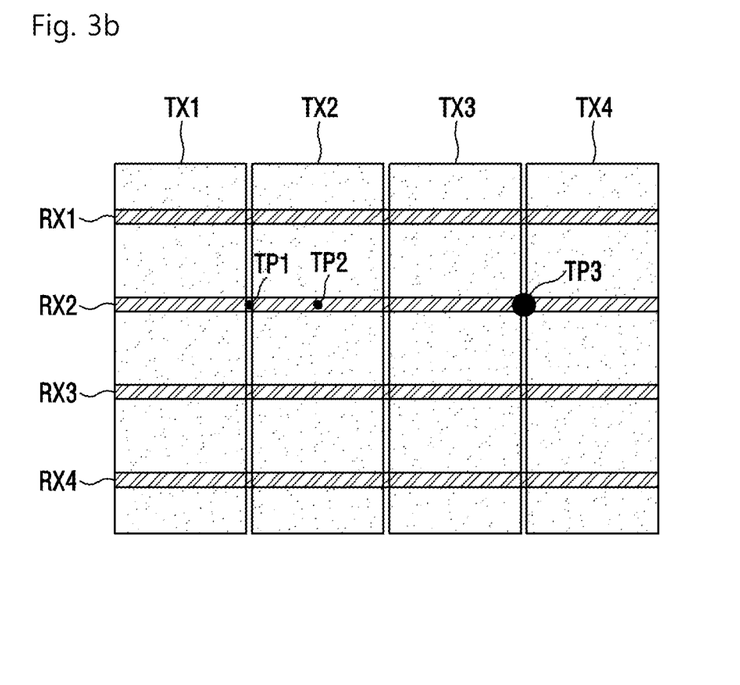
FIGS. 3*b* to 3*c* show a touch node of a typical touch sensor panel.
Figure 3C:
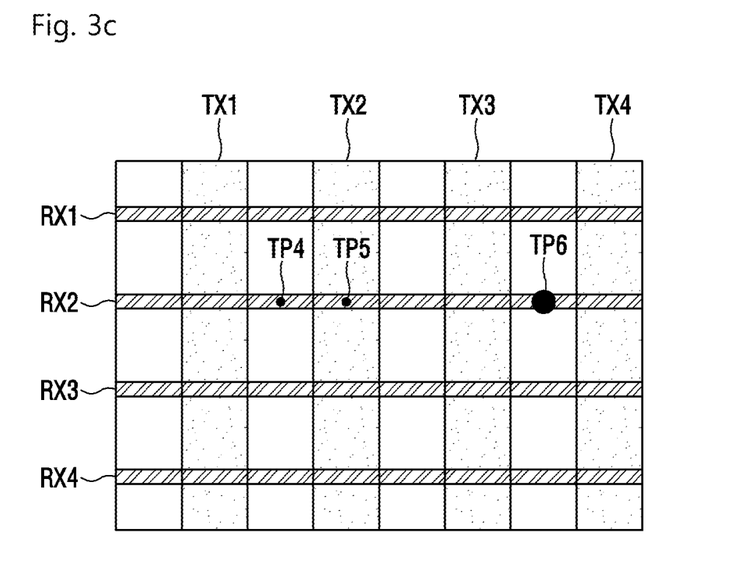

FIG. 3a is a view for describing a typical operation to touch the touch sensor panel by using the stylus pen. FIGS. 3b to 3c show a touch node of a typical touch sensor panel.

Referring to FIG. 3a, the touch sensor panel 1 can be touched by using the stylus pen 3. The touch sensor panel 1 can determine whether or not the touch of a part of the user's body or the stylus pen 3 has occurred and the touch position.

Referring to FIGS. 3b to 3c, in the typical touch sensor panel 1, depending on the position of the touch of a part of the user's body or the stylus pen 3, the accuracy of the touch position determination may vary.

Specifically, the touch position of the stylus pen 3 is the crossing of the drive electrode and the receiving electrode, that is to say, is just above the touch nodes (TP2 and TP5), the accuracy of touch position detection is increased. However, the touch position gets further from the touch nodes (TP1 and TP4), the accuracy of the touch position detection may be reduced. This accuracy is somewhat affected by the touch areas TP3 and TP6 of the object touching the touch sensor panel 1. However, the accuracy may be greatly changed according to the width of the drive electrode constituting the touch sensor panel 1. The capacitance change amount according to the width or pattern shape of the drive electrode will be described in detail with reference to FIGS. 8 to 10.

Figure 4A:
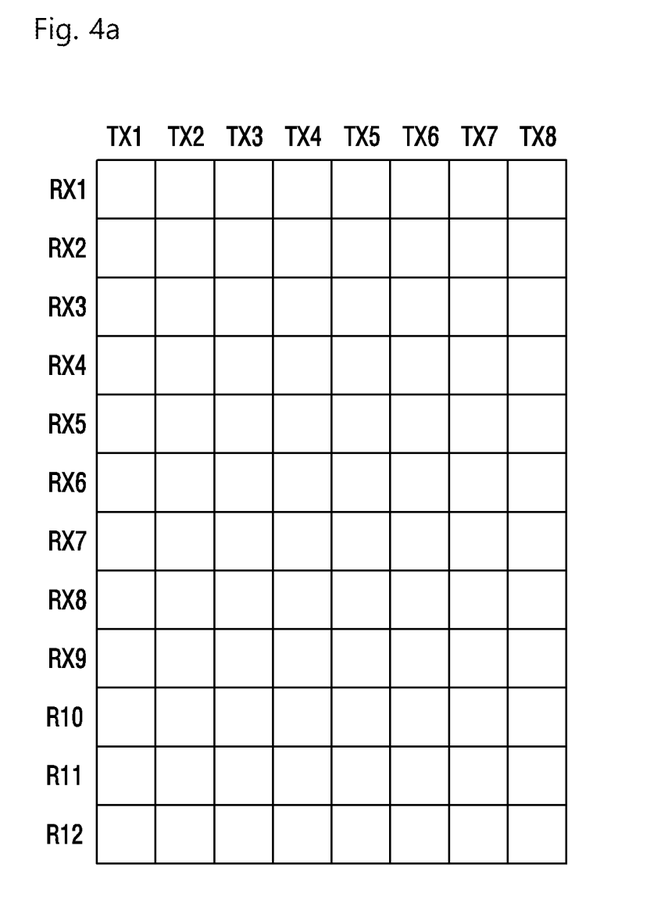
FIGS. 4*a* to 4*c* are views for describing the capacitance change according to the position of a touch center point at one touch node of the typical touch sensor panel.
Figure 4B:
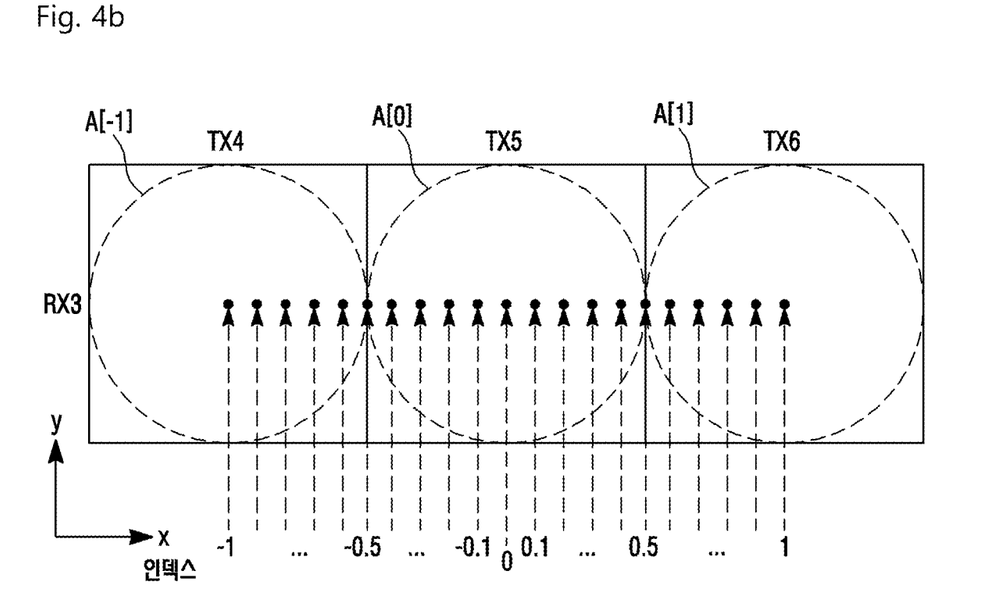
Figure 4C:
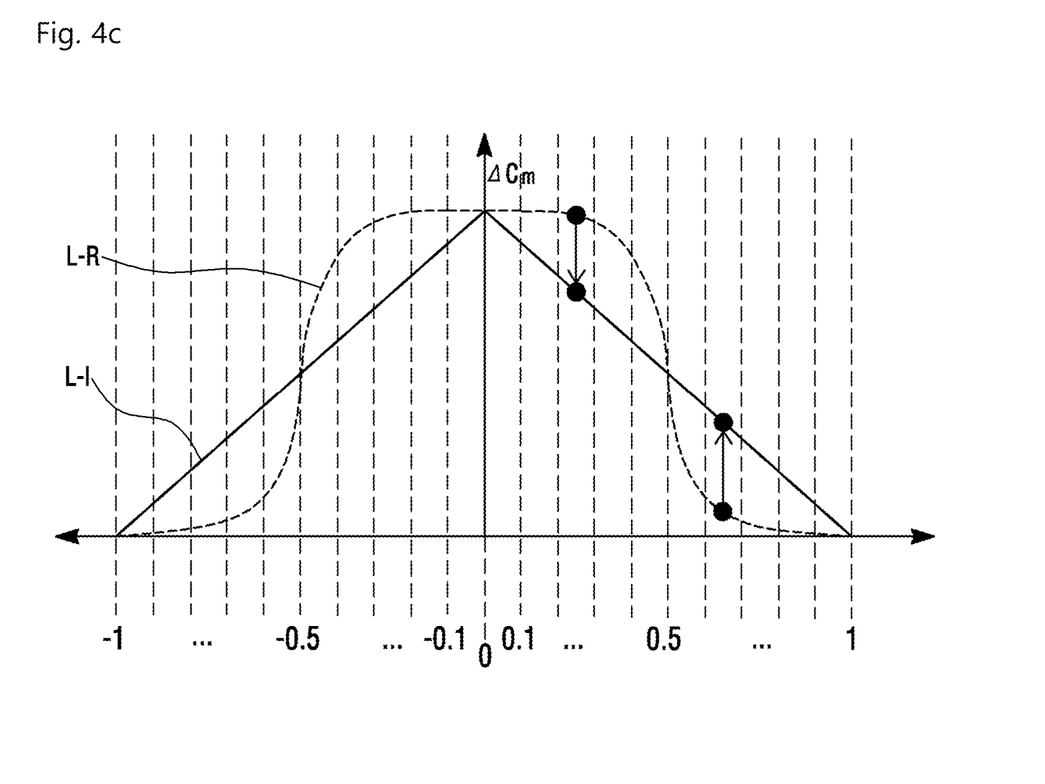

FIGS. 4a to 4c are views for describing the capacitance change according to the position of a touch center point at one touch node of the typical touch sensor panel.

Referring to FIG. 4a, the touch sensor panel includes 12 receiving electrodes RX1 to RX12 and eight drive electrodes TX1 to TX8. The area of each touch node at which the receiving electrode and each of the drive electrodes cross is represented by a square. When the touch occurs by means of a part of the user's body or the stylus pen, the area shielding an electric field which is directed from the drive electrode to the receiving electrode may be modeled an ellipse or a circle. For convenience of description, a case where the area is modeled as a circle will be described.

Referring to FIG. 4b, the touch nodes [RX3, TX4], [RX3, TX5], and [RX3, TX6] of FIG. 4a receive the touch input, the area where the electric field has been shielded can be represented by circular areas A[−1], A[0], and A[1]. When the touch nodes [RX3, TX4], [RX3, TX5], and [RX3, TX6] receive the touch input with a same distance interval from each other, the capacitance change amount of each touch input is represented as shown in FIG. 4c.

Referring to FIG. 4c, the y axis represents the capacitance change amount ΔCm of the touch nodes [RX3, TX4], [RX3, TX5], and [RX3, TX6], and the +x axis and the −x axis represent separation distances to the right or left from the center point of the touch node [RX3, TX5].

The center point of the touch node [RX3, TX5] are represented by an index [0], and the center points of the touch nodes [RX3, TX4] and [RX3, TX6] adjacent to the right or left of the touch node [RX3, TX5] are respectively represented by an index [−1] and an index [1]. The indices [−1] to [1] are obtained by distinguishing from the center point of the touch node [RX3, TX4] to the center point of the touch node [RX3, TX6] at an equal interval.

Specifically, when the touch is input to the center point of the touch node [RX3, TX5], that is, to the point of the index [0], the electric field on the touch node [RX3, TX5] is shielded most, so that the value of y becomes maximum. On the other hand, when the touch is input to the center point of the touch node [RX3, TX4], that is, to the point of the index [−1] or when the touch is input to the center point of the touch node [RX3, TX6], that is, to the point of the index [1], the electric field on the touch node [RX3, TX5] is not shielded, so that the value of y becomes minimum (ideally '0'). As such, the capacitance change amount ΔCm at the index point obtained by distinguishing respective touch nodes at an equal interval is actually measured as a curve L-R.

When the touch is input to the index point obtained by distinguishing the touch nodes at an equal interval, the closer the capacitance change amount ΔCm according to the position of the touch input is to a straight line L-I, the position calculation of the touch input in a touch input position detection processor can be simpler and more accurate. When the capacitance change amount ΔCm at the index points [−1] to [−0.5] and the index points [0.5] to [1] is increased and when the capacitance change amount ΔCm at the index points [−0.5] to [0] and the index points [0] to [0.5] is reduced, the capacitance change amount ΔCm according to the position of the touch input is linearly changed, so that the touch input position detection can be easily performed when the touch input point is moved.

Interpolability which represents the appropriate degree of interpolation can be obtained by measuring the magnitude of capacitance change ΔCm between two adjacent cells (touch nodes) in accordance with the distance. The following equation 1 represents a quantified difference between an ideal interpolation response profile L-I (IRP: Interpolation Response Profile) and an actual interpolation response profile L-R. The equation 1 shows that the larger the Interpolability value is, the closer the actual value is to an ideal value.

$$\text{Interpolability} = \frac{n}{\sqrt{D(x_1)^2 + D(x_2)^2 + \ldots + D(x_n)^2}} \quad \text{Equation (1)}$$

According to the embodiment of the present invention, the patterns of the drive electrode and the receiving electrode can be designed such that the actual interpolation response profile get close to the ideal interpolation response profile. Since the interpolation response profile has a symmetrical shape, this profile needs to be designed such that each touch node of the touch sensor panel has a pattern which is right-and-left and/or up-and-down symmetrical with respect to the node center point. Particularly, the shape of the electrode pattern needs to be designed such that the capacitance change amount ΔCm in the range of the index [0.2] to [0.3] and index [−0.2] to [−0.3] is less than that of a general electrode pattern (a pattern in which a quadrangular drive electrode and a quadrangular receiving electrode are orthogonal to each other to have a certain width) and the capacitance change amount ΔCm in the range of the index [0.6] to [0.7] and index [−0.6] to [−0.7] is greater than that of the general electrode pattern.

Figure 5:
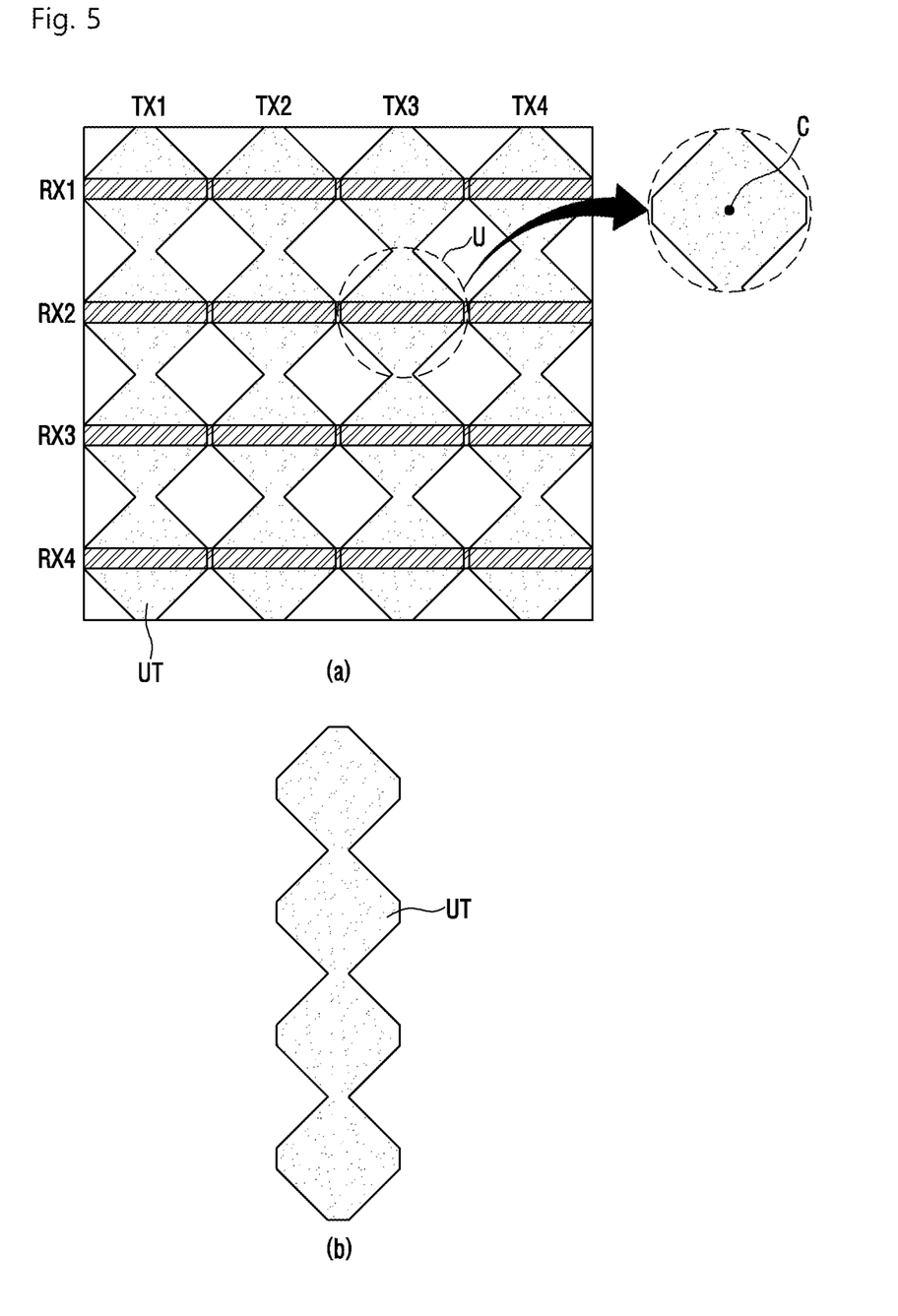
FIGS. 5 to 7 show various patterns of the touch sensor panel according to the embodiment of the present invention.
Figure 6:
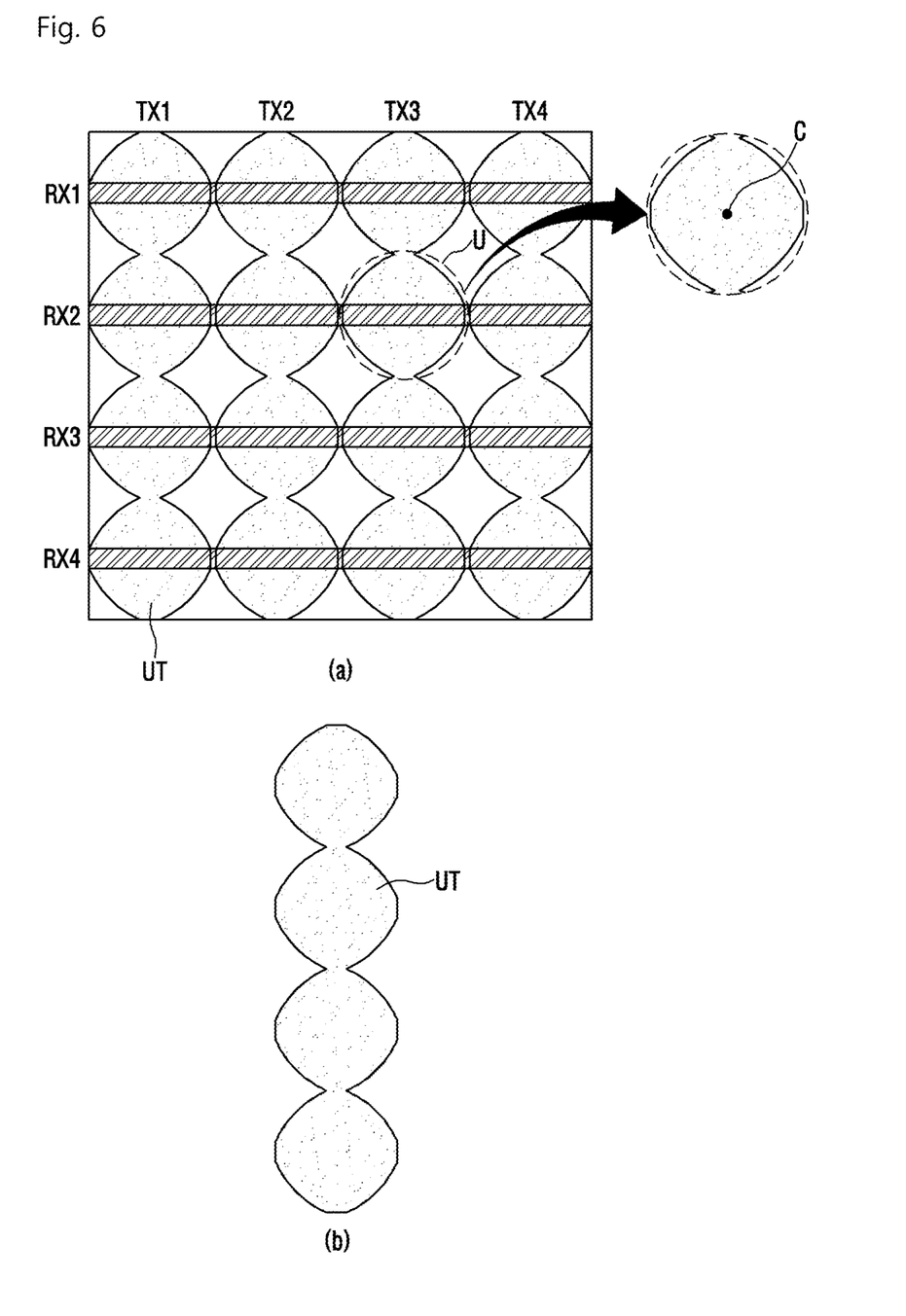
Figure 7:
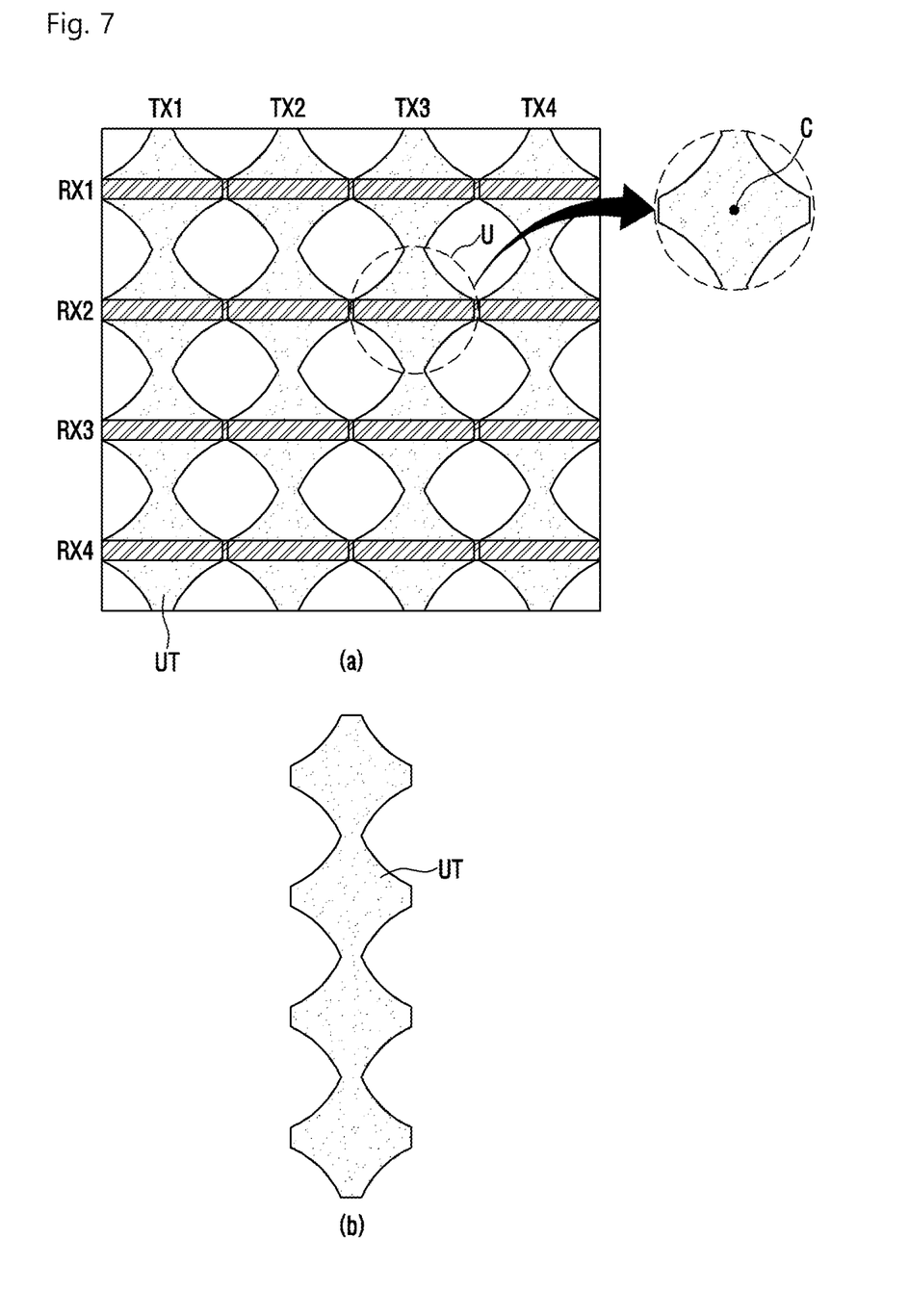

FIGS. 5 to 7 show various patterns of the touch sensor panel according to the embodiment of the present invention.

Referring to FIG. 5, the touch sensor panel according to the embodiment of the present invention may include the plurality of drive electrodes TX1 to TX4 formed in the first layer and include the plurality of receiving electrodes RX1 to RX4 which are disposed to cross the plurality of drive electrodes TX1 to TX4 and are formed in the second layer. Here, in the plurality of drive electrodes TX1 to TX4, a column of drive electrodes UT is formed by connecting a plurality of lozenge-shaped unit electrodes U in the column direction, and the drive electrodes UT of each column may be disposed at a regular interval in the row direction. Also, the plurality of receiving electrodes RX1 to RX4 may be composed of a line having a predetermined width and may be arranged in the row direction in such a way as to pass through the center C of the unit electrode U.

The unit electrode U may be formed in the form of a right-and-left and up-and-down symmetrical shape with respect to the center C. Specifically, the unit electrode U has only a lozenge shape as a whole. A portion connected to adjacent unit electrodes has a certain width and four symmetrical sides, and thus, the unit electrode U has a substantially octagonal shape. Here, the description of the shape of the unit electrode U is for describing a specific shape of the drive electrode. The unit electrodes U do not form a physically separated pattern. A predetermined number of unit electrodes U may be connected to form a column of drive electrodes UT.

The plurality of receiving electrodes RX1 to RX4 may be disposed such that the center line of a line having a predetermined width crosses the center C of each unit electrode U.

According to the embodiment of the present invention, the widths of the plurality of receiving electrodes RX1 to RX4, the size of the lozenge, and the interval between the drive electrodes of each column are determined such that the mutual capacitance between the plurality of drive electrodes TX1 to TX4 and the plurality of receiving electrodes RX1 to RX4 is approximately linearly changed. That is, in a case where the position of the touch input is changed according to the receiving electrode, the capacitance may be approximately linearly changed due to the lozenge shape of the unit electrode U even when the touch is input to one unit electrode U.

The capacitance change amount is related to the width of the drive electrode. In the embodiment, the best linearity can be realized when the width of the unit electrode U is 2.9043 micrometers, the interval between the drive electrodes of each column is 0.06 micrometers, and a pitch of the drive electrode is 2.9643 micrometers. However, this may be changed according to the material and/or thickness of the used[or embodied] electrode, the material and/or thickness of the insulator, the voltage magnitude of the drive signal, pulse width, etc.

Referring to FIGS. 6 to 7, the lozenge-shaped unit electrode is formed by connecting each side of the lozenge-shaped unit electrode with convex line or concave line.

In this case, only the shape of the unit electrode U and the shape of the drive electrode of each column formed by connecting the unit electrodes U are different. The shape and arrangement method of the plurality of receiving electrodes RX1 to RX4 can be the same.

According to another embodiment of the present invention, the widths of the plurality of receiving electrodes RX1 to RX4, the size of the lozenge having convex or concave sides, and the interval between the drive electrodes of each column are determined such that the mutual capacitance between the plurality of drive electrodes TX1 to TX4 and the plurality of receiving electrodes RX1 to RX4 is approximately linearly changed. That is, in a case where the position of the touch input is changed according to the receiving electrode, the capacitance may be approximately linearly changed due to the lozenge shape of the unit electrode U even when the touch is input to one unit electrode U. The shape of the side of the lozenge can be variously changed.

Further, as described above, an insulation layer (e.g., an adhesive layer) may be further included between the first layer in which the drive electrode is formed and the second layer in which the receiving electrode is formed.

Figure 8A:
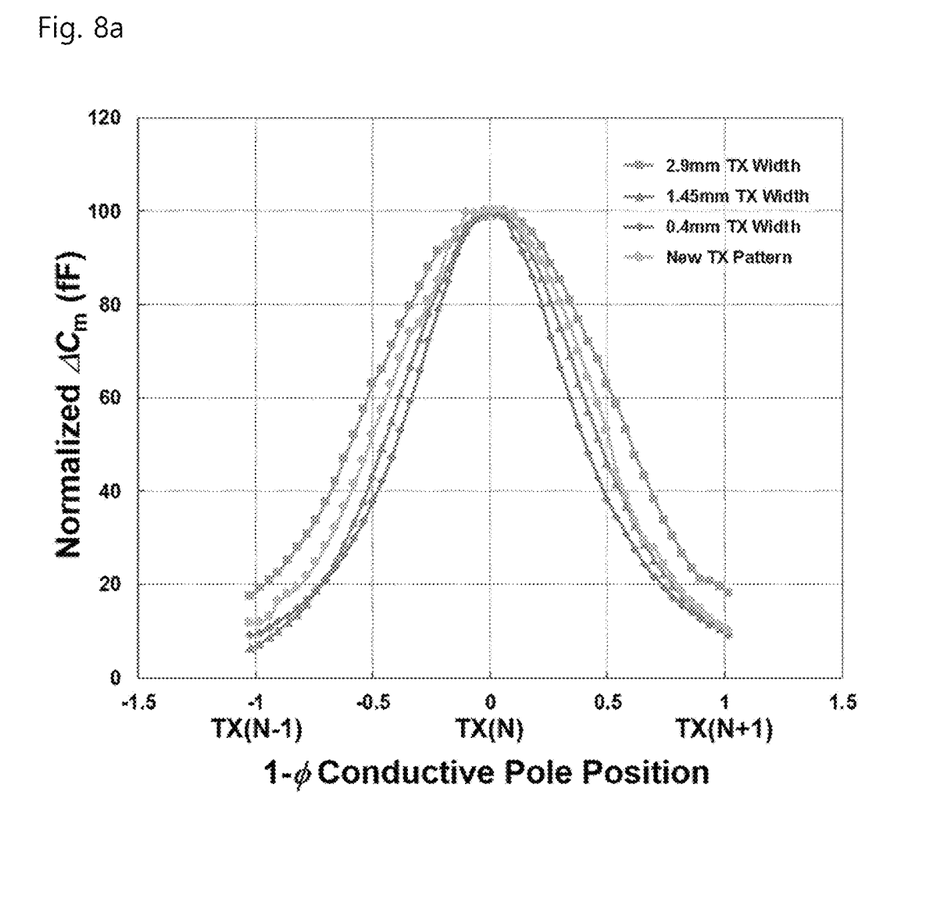
FIGS. 8*a*, 8*b*, 9 and 10 show data obtained by simulating the linearity of the touch sensor panel according to the embodiment of the present invention.
Figure 8B:
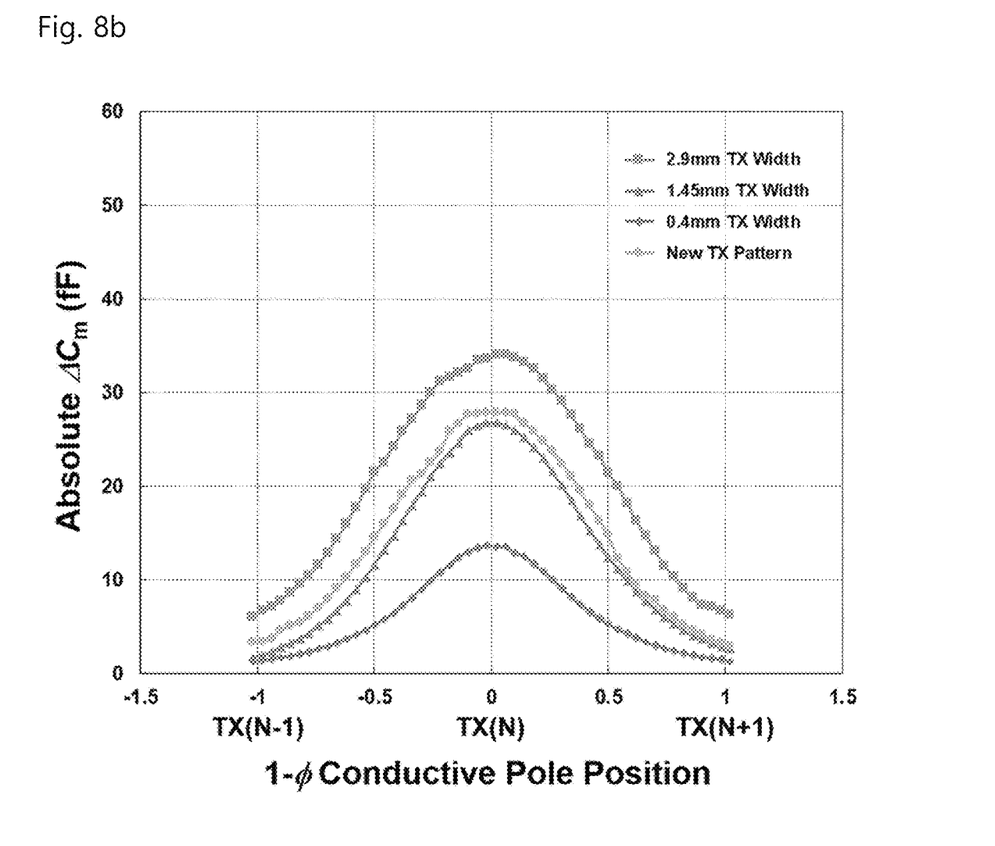
Figure 9:
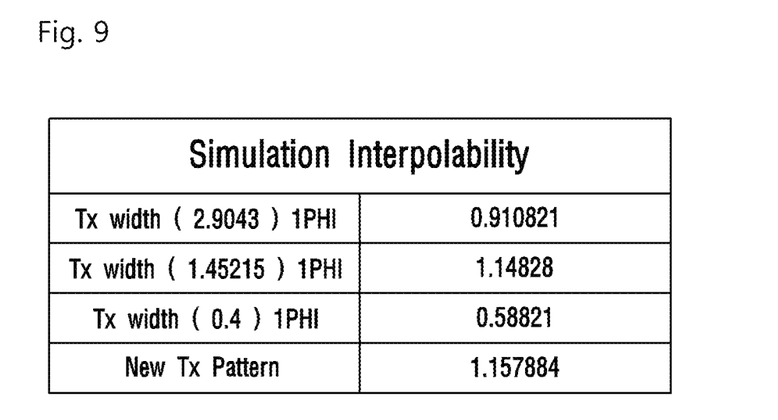
Figure 10:
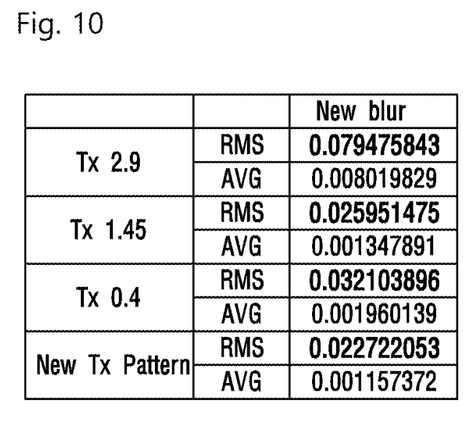

FIGS. 8 to 10 show data obtained by simulating the linearity of the touch sensor panel according to the embodiment of the present invention.

FIGS. 8*a* to 8*b* show graphs obtained by simulating the linearity according to the pattern shape of the drive electrode of the touch sensor panel according to the embodiment of the present invention.

Referring to FIGS. 8*a* to 8*b*, in three conventional touch sensor panels (Tx width: 2.9, 1.45, 0.4) of which the widths of the rectangular drive electrode patterns are different from each other and the touch sensor panel (New TX Pattern) including the lozenge-shaped drive electrode according to the embodiment of the present invention, a graph obtained by simulating the capacitance change amount when the touch is input to three adjacent touch nodes is shown. In the three different conventional touch sensor panels (Tx width: 2.9, 1.45, 0.4) and the touch sensor panel (New TX Pattern) including the lozenge-shaped drive electrode according to the embodiment of the present invention, FIG. 8*b* shows that the capacitance change amount $\Delta$Cm when the touch is input to three adjacent touch nodes is represented by absolute values. FIG. 8*a* shows that the absolute value of each of the cases is normalized.

Comparing the graphs from the point at index [−1] to the point at index [1], it can be seen that New TX Pattern has the best linearity. This will be described in more detail with reference to data of FIGS. 9 to 10.

FIG. 9 shows data obtained by calculating interpolability in accordance with the pattern shape of the drive electrode of the touch sensor panel according to the embodiment of the present invention. FIG. 10 shows data obtained by applying a linearity measurement algorithm according to the pattern shape of the drive electrode of the touch sensor panel according to the embodiment of the present invention.

FIG. 9 shows the interpolability calculated by using the foregoing equation (1). As a result of the calculation, the interpolability is changed as the width of the conventional drive electrode (rectangular shape) of the touch sensor panel is increased, and it can be found that the interpolability is the best when the width is 1.45215 micrometers. Meanwhile, in the case of the embodiment of the present invention in which the pattern of the drive electrode of the touch sensor panel has a lozenge shape (New TX Pattern), it can be seen that the interpolability is more improved than that when the width of the rectangular drive electrode pattern is 1.45215 micrometers.

Referring to FIG. 10, the width of the drive electrode having the rectangular pattern is varied by applying a specific algorithm for measuring the linearity of the capacitance change amount of the touch sensor panel in accordance with the shape of the drive electrode, so that Root Mean Square (RMS) data is obtained. Then, a result of obtaining the RMS data can be seen by using the touch sensor panel using the lozenge-shaped drive electrode to which the embodiment of the present invention has been applied. Comparing the obtained data, it can be found that, when the new pattern (lozenge pattern) of the present invention is applied (New TX Pattern), the RMS data is the least calculated as '0.022722053', and thus, the linearity is excellent.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch sensor panel comprising:
a plurality of drive electrodes formed in a first layer; and
a plurality of receiving electrodes which are arranged to cross the plurality of drive electrodes and are formed in a second layer,
wherein, in the plurality of drive electrodes, a column of drive electrodes is formed by connecting a plurality of lozenge-shaped unit electrodes in a column direction, each of the unit electrodes having a center portion, an upper portion above the center portion, and a lower portion below the center portion,
wherein the drive electrodes of each column are disposed at a regular interval in a row direction,
wherein each of the plurality of receiving electrodes are composed of a line arranged in the row direction in such a way that the line passes through the center portion of the unit electrode and not the upper portion or the lower portion of the unit electrode, and
wherein the second layer is disposed on the first layer.

2. The touch sensor panel of claim 1, wherein the unit electrode has a right-and-left and up-and-down symmetrical shape with respect to the center.

3. The touch sensor panel of claim 1, wherein the lozenge-shaped unit electrode is formed by connecting each side of the lozenge-shaped unit electrode with convex line or concave line.

4. The touch sensor panel of claim 1, further comprising an insulation layer between the first layer and the second layer.

5. The touch sensor panel of claim 1, comprising an adhesive layer between the first layer forming the plurality of drive electrodes and the second layer forming the plurality of receiving electrodes.

6. The touch sensor panel of claim 1, wherein one or more of the plurality of lozenge-shaped unit electrodes are connected by the line.

7. A touch sensor panel comprising:
a plurality of first electrodes formed in a first layer; and
a plurality of second electrodes which are arranged to cross the plurality of first electrodes and are formed in a second layer,
wherein, in the plurality of first electrodes, a column of first electrodes is formed by connecting a plurality of unit electrodes in a column direction, each of the unit electrodes having a length in the column direction,
wherein the first electrodes of the column are disposed at a regular interval in a row direction,
wherein the plurality of second electrodes are composed of a line having a predetermined width in the column direction, the line being arranged in the row direction in such a way that a center of the predetermined width of the line passes through a center of the unit electrode, the length of each of the unit electrodes in the column direction being greater than the width of the line of the plurality of receiving electrodes, and
wherein the second layer is disposed on the first layer.

8. The touch sensor panel of claim 7, wherein the unit electrode has a right-and-left and up-and-down symmetrical shape with respect to the center.

9. The touch sensor panel of claim 7, wherein the unit electrode is formed by connecting each side of the unit electrode with convex line or concave line.

10. The touch sensor panel of claim 7, further comprising an insulation layer between the first layer and the second layer.

11. The touch sensor panel of claim 7, wherein the plurality of second electrodes are disposed such that a center line of a line having a predetermined width crosses the center of each unit electrode.

12. The touch sensor panel of claim 7, wherein one or more of the plurality of lozenge-shaped unit electrodes are connected by the line.

13. A touch sensor panel comprising:
a plurality of drive electrodes formed in a first layer; and
a plurality of receiving electrodes which are arranged to cross the plurality of drive electrodes and are formed in a second layer,
wherein, in the plurality of drive electrodes, a column of drive electrodes is formed by connecting a plurality of lozenge-shaped unit electrodes in a column direction, and the drive electrodes of each column are disposed at a regular interval in a row direction,
wherein each of the plurality of receiving electrodes are composed of a line having a predetermined width and are arranged in the row direction in such a way for a center of the predetermined width of the line passing through only center part of the unit electrode, and
wherein the second layer is disposed on the first layer.

14. The touch sensor panel of claim 13, wherein the unit electrode has a right-and-left and up-and-down symmetrical shape with respect to the center.

15. The touch sensor panel of claim 13, wherein the lozenge-shaped unit electrode is formed by connecting each side of the lozenge-shaped unit electrode with convex line or concave line.

16. The touch sensor panel of claim 13, further comprising an insulation layer between the first layer and the second layer.

* * * * *